(12) United States Patent
Frucht

(10) Patent No.: US 9,139,304 B2
(45) Date of Patent: Sep. 22, 2015

(54) UNSPINNING A PAYLOAD EJECTED FROM A SPINNING PROJECTILE

(71) Applicant: DR. FRUCHT SYSTEMS LTD., Haifa (IL)

(72) Inventor: Yaacov Frucht, Haifa (IL)

(73) Assignee: DR. FRUCHT SYSTEMS LTD., Haifa (IL)

(*) Notice: Subject to any disclaimer, the term of this patent is extended or adjusted under 35 U.S.C. 154(b) by 0 days.

(21) Appl. No.: 14/263,912

(22) Filed: Apr. 28, 2014

(65) Prior Publication Data
US 2014/0374540 A1 Dec. 25, 2014

(30) Foreign Application Priority Data

Apr. 28, 2013 (IL) .......................................... 226016

(51) Int. Cl.
*F42B 10/02* (2006.01)
*B64D 17/24* (2006.01)
*F42B 10/26* (2006.01)
*F42B 10/54* (2006.01)

(52) U.S. Cl.
CPC ................ *B64D 17/24* (2013.01); *F42B 10/26* (2013.01); *F42B 10/54* (2013.01)

(58) Field of Classification Search
USPC ......... 244/3.1, 3.23, 3.24, 3.29; 102/387, 382
See application file for complete search history.

(56) References Cited

U.S. PATENT DOCUMENTS

| | | | | | |
|---|---|---|---|---|---|
| 3,128,845 | A | * | 4/1964 | Parker et al. .................. | 188/378 |
| 3,229,930 | A | * | 1/1966 | Fedor et al. ................. | 244/158.1 |
| 3,286,630 | A | * | 11/1966 | Salmirs et al. ................ | 102/377 |
| 3,715,092 | A | * | 2/1973 | Moyer et al. ................ | 244/172.6 |
| 4,350,315 | A | * | 9/1982 | Pollin ......................... | 244/3.23 |
| 4,436,259 | A | * | 3/1984 | Schmidt et al. ............... | 244/165 |
| 4,674,705 | A | * | 6/1987 | Schleicher ..................... | 244/3.1 |
| 4,690,350 | A | * | 9/1987 | Grosso et al. .................. | 244/3.1 |
| 4,753,171 | A | * | 6/1988 | Stessen ......................... | 102/387 |
| 4,848,235 | A | * | 7/1989 | Postler et al. ................. | 102/393 |
| H776 | H | * | 5/1990 | Cole ............................ | 102/498 |
| 2008/0196578 | A1 | * | 8/2008 | Eden et al. ..................... | 89/1.11 |

* cited by examiner

*Primary Examiner* — Benjamin P Lee
(74) *Attorney, Agent, or Firm* — Holtz, Holtz, Goodman & Chick PC

(57) ABSTRACT

Method and system for unspinning a payload ejected from a spinning artillery projectile where the projectile is loaded with a cargo holding the payload and a payload unspinning device. The cargo is ejected from the projectile and the payload unspinning device is operated. The cargo includes a parachute and a shroud which covers the folded parachute and at least a portion of the payload. The payload unspinning device includes at least two yo-yo cords. Ejection of the cargo is followed sequentially by unwinding of the at least two yo-yo cords, liberation of the shroud, deployment of the parachute and stabilization of the payload.

6 Claims, 2 Drawing Sheets

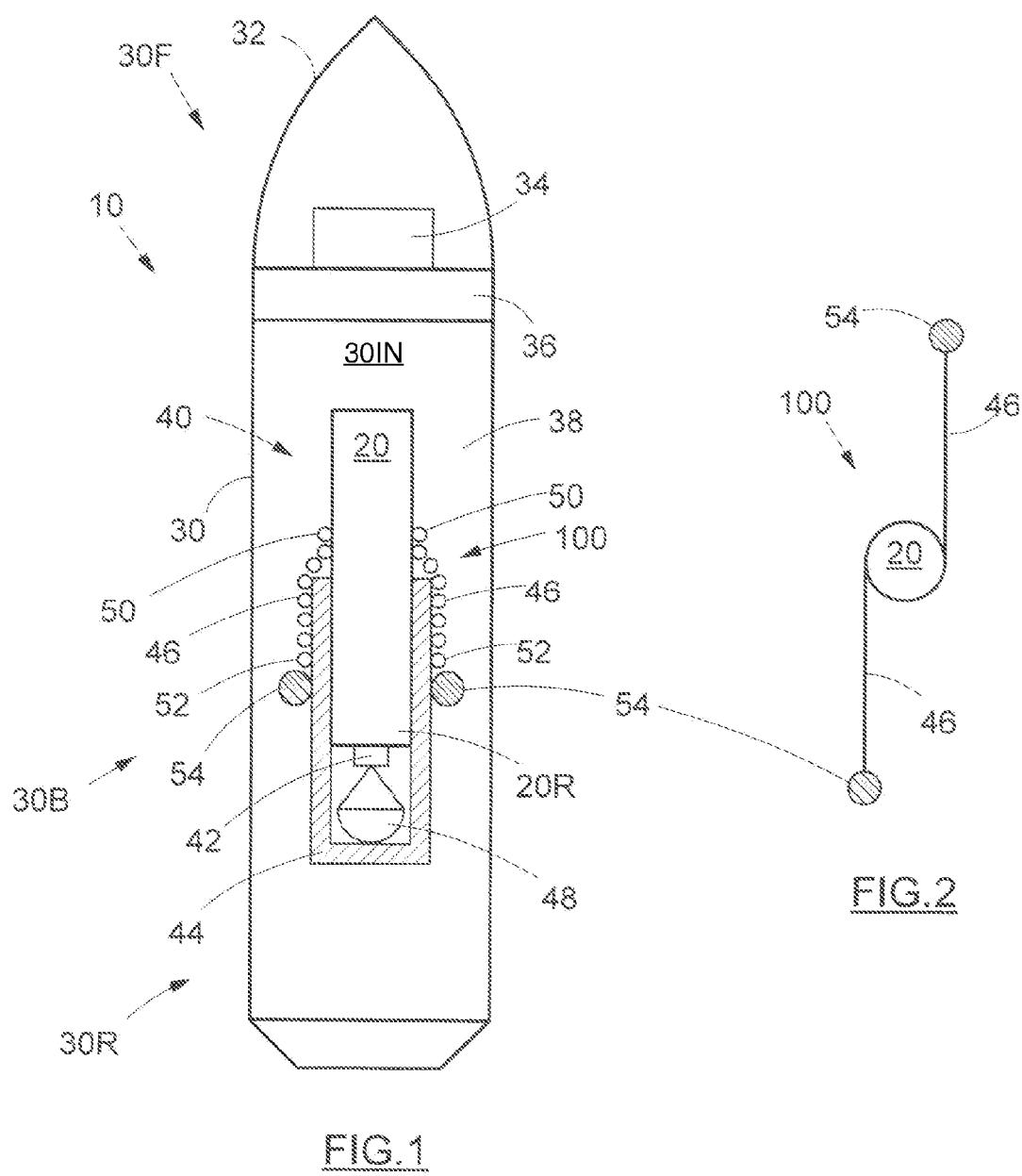

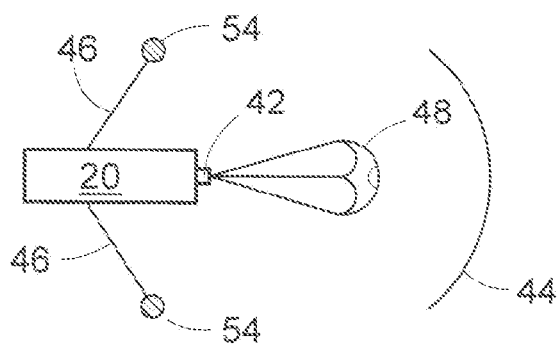
FIG.3
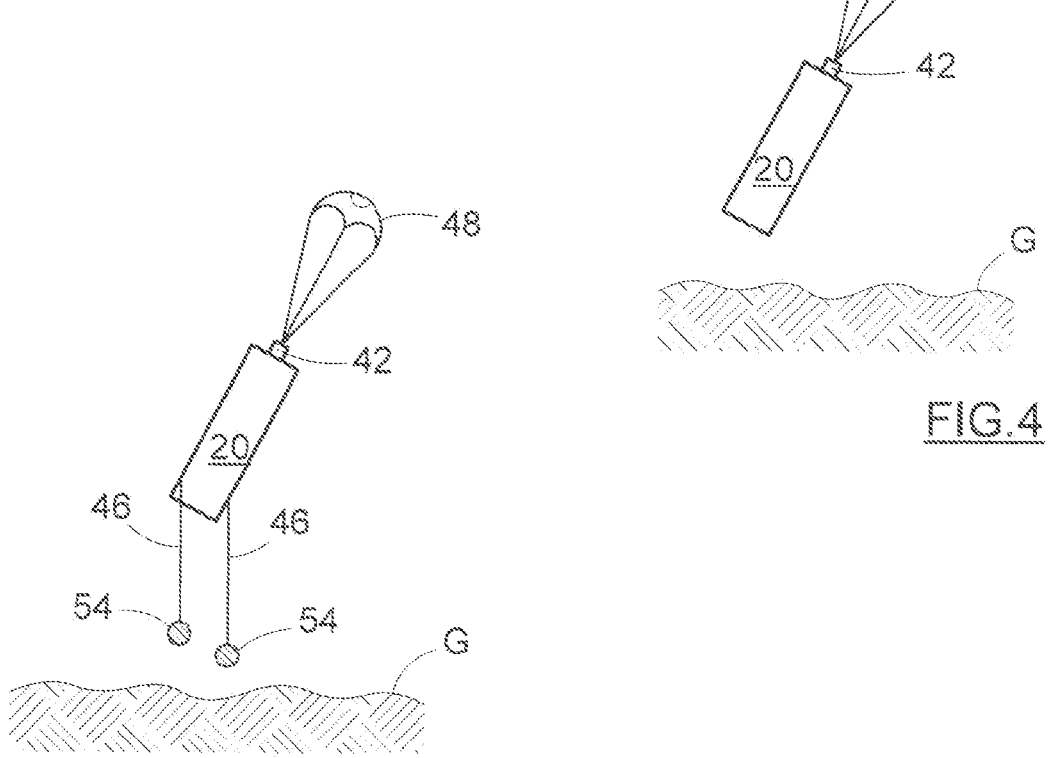
FIG.4
FIG.5

UNSPINNING A PAYLOAD EJECTED FROM A SPINNING PROJECTILE

TECHNICAL FIELD

The present invention relates to the field of weapon systems, and more particularly to the unspinning and stabilization of a payload ejected from a spinning projectile.

Technical Problem

Body stability and angle of arrival problems are encountered when attempting to eject a payload intended to approach the ground about perpendicularly, when the payload is ejected out of a spinning shell travelling in ballistic trajectory. Upon ejection from the spinning shell and deployment of a parachute, the payload spins and wobbles wildly and reaches the ground at shallow angles instead of about perpendicularly.

Solution to Problem

The problem is solved by first starting to de-spin the payload, at least mostly and next, to deploy the parachute. The terms 'de-spin' and 'unspin' and derivations thereof are intended to mean reduction of the rate of spin of the payload to below a predetermined rate of spin accepted as being negligible for practical purposes. Thereby, the payload is practically spin-free during descent and closes-in to the ground in near to vertical orientation. De-spinning is achieved by use of a payload unspinning device operating "yo-yo" cords. Furthermore, the parachute which is deployed after unspinning may be coupled to the payload by bearings to mitigate transmission of spin from the payload to the parachute.

BRIEF DESCRIPTION OF THE DRAWINGS

FIG. 1 shows a cross-section of a spin-stabilized payload-carrying projectile,

FIG. 2 depicts a cross-section through the payload showing the cord weights and the yo-yo cords, FIG. 3 illustrates the payload after liberation out of the casing, showing the released shroud, the open canopy of the parachute, and the yo-yo cords which are terminated by cord weights, FIG. 4 shows the stabilized payload supported by the open parachute, and FIG. 5 depicts the payload whereto yo-yo cords are fixedly coupled.

DESCRIPTION OF EMBODIMENTS

FIG. 1 is a schematic exemplary embodiment showing a cross-section of a payload-carrying projectile 10, such as an artillery shell for example, holding a payload 20 in the interior 30IN of a projectile casing 30. Payload-carrying projectiles are well known to those skilled in the art and need therefore not to be described in detail.

The front-portion 30F of the projectile casing 30 has an ogive 32 supporting a control unit 34 and a projectile-separation and ejection mechanism 36. The body 30B of the projectile casing 30 has a cargo compartment 38 wherein a cargo 40 carrying the payload 20 is stored. The projectile casing 30 may terminate in a casing end portion 30R.

Elements of the cargo 40 carried by the projectile 10 may include the payload 20, an optional bearing mechanism 42, a shroud 44, and yo-yo cords 46, which elements are securely packaged in the cargo compartment 38. The shroud may be selected as a foldable covering chosen for the protection of the payload 20.

An end portion 20R of the payload 20 may support the bearing mechanism 42 for coupling a parachute 48 thereto, which parachute is shown in a folded state in FIG. 1. A portion of the payload 20 is covered by the shroud 44 which also covers the optional bearing mechanism 42 and the parachute 48. The shroud 44 may be made of lightweight foldable and pliable material selected for example out of the same material as used for the canopy of the parachute 48, or of other suitable natural or artificial material chosen as desired.

Yo-yo cords 46, for example two such cords 46, may be wrapped around a portion of the shroud 44. A first end 50 of each yo-yo cord 46 may be fixedly or releasably coupled to the payload 20, and a portion of each yo-yo cord 46 with a second end 52 is fixedly coupled to a cord weight 54.

In operation, the projectile 10 is launched into ballistic trajectory from a gun barrel of an artillery piece, not shown, as a spin-stabilized projectile. At a predetermined point in time on the trajectory, or at a preset distance along the ballistic trajectory, the projectile-separation and ejection mechanism 36 may be operated to eject the cargo 40, for example by a command provided by the control unit 34. Alternatively, the ejection command may be communicated to the projectile 10 by other methods. In result thereof, the spinning projectile casing 30 will open up and release the cargo 40, which spins too.

Once liberated from the projectile casing 30, spinning of the cargo 40 will apply centrifugal forces on the cord weights 54 which will pull on the yo-yo cords 46. In turn, the yo-yo cords 46 will start to gradually unwind from around the shroud 44 and extend radially away relative to the cargo 40.

FIG. 2 is a schematic exemplary embodiment illustrating a cross-section through the payload 20 showing the cord weights 54 already distanced radially away from the payload 20 and coupled thereto by the yo-yo cords 46. The progressive radial extension of the cord weights 54 decreases the rate of spin of the cargo 40. However, the unwinding of the yo-yo cords 46 will come to an end and therewith, unwrapping from around the shroud 44 will also end, thereby liberating the shroud 44 away from the payload 20. The aerodynamic and centrifugal forces that separate the shroud 44 away from the payload 20 allow the folded parachute 48 to deploy a functionally open canopy.

It is noted that one task of the shroud 44 is to prevent tangling of the canopy of the parachute 48 with the cords of the parachute and with the yo-yo cords 46. Another task of the shroud 44 is to ensure the safe deployment of the parachute 48 after the spin of the payload 20 is practically stopped by the unspinning device 100.

In a first case if desired, the yo-yo cords 46 may detach themselves from the payload 20, and in a second case, remain coupled to the payload 20. When the yo-yo cords are simply wound, without fixedly attaching the cord first end 50 to the payload 20, they will detach themselves when unwinding comes to an end. Else, in the second case, the yo-yo cords will hang below the payload 20 during descent thereof toward the ground G.

For a typical projectile 10 such as an artillery shell, say a 155 mm caliber shell, and for cord weights 54 of 100 grams, the length of the yo-yo cords 46 necessary to practically stop the spinning of the payload 20 is about 80 cm.

FIG. 3 depicts the payload 20 after liberation out of the casing 30, showing the released shroud 44, the open canopy of the parachute 48, and the yo-yo cords 46 each one terminated by a cord weight 54. The now unfolded canopy of the parachute 48 will contribute to unspin residual spin and to stabilize the payload 20. The optionally available bearing mechanism 42 which may couple the parachute 48 to the payload 20 may prevent some residual spinning of the payload 20 from rotating the parachute 48. However, after liberation of the shroud 44, the possibly remaining relatively slow spin does not usually interfere with the stabilized descent of the payload 20 to the ground G.

In FIG. 4 the stabilized payload 20 supported by the open parachute 48 is shown in free flight descending towards the ground G while approaching a vertical orientation. It is noted that the descent of the payload 20 may be influenced more by atmospheric conditions but not so much anymore by a residual spin of the slowly descending parachute-stabilized payload 20. Vertical approach of the ground G is achieved even though the payload 20 descends from a relatively low above-the-soil altitude of the shallow parabolic trajectory that may be imparted by an artillery gun.

FIG. 5 depicts the payload 20 whereto yo-yo cords 46 are fixedly coupled. The payload 20 is still above ground G but at least one of the cord weights 54 just touches ground G. If desired, the contact of one or of both weights 54 with the ground G may operate the payload 20, say operate as a proximity fuze. Operating the payload 20 may mean for example, activation, opening, or initiating the functioning or the explosion of the payload 20.

The practical implementation of the system described hereinabove and the manner of use of such a system is straightforward to those skilled in the art and does not pose technological or logistical problems. Hence, a detailed description of such aspects is not required.

The description hereinabove thus provides a method for unspinning a payload 20 ejected out of a spinning artillery projectile 10. Prior to ejection, the projectile 10 has to be loaded with a cargo 40 which holds therein the payload 20 and a payload unspinning device 100. Thereafter the cargo 40 is ejected out and away from the projectile 10 and the payload unspinning device 100 is operated.

The cargo 40 includes a parachute 48 and a shroud 44, and the parachute 48 may be coupled to the payload 20 either by a bearing mechanism 42 or be coupled thereto in fixed attachment. The parachute 48 has a folded state when disposed in the interior of the cargo compartment 38, and reaches a deployed state after operation of the payload unspinning device 100. When disposed in the cargo compartment 38, the shroud 44 covers the folded parachute 48 and at least a portion of the payload 20.

The payload unspinning device 100 includes at least two yo-yo cords 46, and each cord thereof has a first end 50 and a portion with a second end 52. The first end 50 is coupled to the payload and the end of the portion with the second end 52 is attached to a cord weight 54. Evidently, the portion with the second end 52 of the at least two yo-yo cords 46 is wound a priori over at least a portion of the shroud 44.

Ejection of the cargo 40 is preceded by an ejection command, and the ejection of the cargo 40 is followed by the unwinding of the at least two yo-yo cords 46, the liberation of the shroud 44, and the deployment of the parachute 48. It is noted that the shroud 44 prevents tangling of the canopy of the parachute 48 with the cords 46 of the parachute 48, as well as tangling of the parachute 48 with the yo-yo cords 46. The shroud 44 thus ensures safe deployment of the parachute 48 after liberation of the shroud 44 off and away from the payload 20. Unwinding of the at least two yo-yo cords 46 unspins the cargo 40 and unspins the payload 20 which then descends in stabilized parachuted payload descent for perpendicular or near perpendicular impingement on the ground G.

The description hereinabove also provides a system including a spin stabilized artillery projectile 10 carrying a payload 20, where the system comprises a projectile casing 30 configured to hold therein a cargo 40, and the cargo 40 includes the payload 20 and a payload unspinning device 100. The system further comprises a projectile-separation and ejection mechanism 36 configured for ejection of the cargo 40 out of the projectile 10 and thereafter, for operation of the payload unspinning device 100.

REFERENCE SIGNS LIST

No. Item
10 projectile
20 payload
20R end portion of the payload 20
30 projectile casing
30B body of the projectile casing 30
30F front-portion of the projectile casing 30
30IN interior of the projectile casing 30
30R casing end portion
32 ogive
34 control unit
36 projectile-separation and ejection mechanism
38 cargo compartment
40 cargo
42 bearing mechanism
44 shroud
46 yo-yo cord
48 parachute
50 cord first end
52 cord portion with second end
54 cord weight
100 payload unspinning device

The invention claimed is:

1. A method for unspinning a payload ejected from a spinning artillery projectile, the method comprising:
    loading the projectile with a cargo including the payload and a payload unspinning device, and
    ejecting the cargo from the projectile and operating the payload unspinning device,
    wherein:
    the cargo further includes a parachute and a shroud,
    the parachute has a folded state and a deployed state, and is disposed in the cargo in the folded state,
    the shroud covers the folded parachute and at least a portion of the payload,
    the payload unspinning device includes at least two yo-yo cords, each cord having a first end and a portion with a second end,
    the first end is coupled to the payload and the second end is attached to a cord weight,
    the portion with the second end of the at least two yo-yo cords is wound over at least a portion of the shroud,
    ejection of the cargo is preceded by an ejection command,
    ejection of the cargo is followed by unwinding of the at least two yo-yo cords, liberation of the shroud, deployment of the parachute, and stabilization of the payload,
    unspinning of the cargo unspins the payload for stabilizing parachuted payload descent, and
    contacting ground with at least one cord weight operates the payload.

2. The method of claim 1, wherein the parachute is coupled to the payload by one of a bearing mechanism and a fixed attachment.

3. The method of claim 1, wherein the shroud prevents tangling of the parachute as well as tangling of the parachute with the yo-yo cords, and ensures safe deployment of the parachute.

4. A system including a spin stabilized artillery projectile carrying a payload, the system comprising:

a projectile casing configured to hold therein a cargo, the cargo including the payload and a payload unspinning device, and a projectile separation and ejection mechanism configured for ejection of the cargo out of the projectile and thereafter, for operation of the payload unspinning device, wherein:

the cargo further includes a parachute and a shroud, the parachute has a folded state and a deployed state, and is disposed in the cargo in the folded state, the shroud covers the folded parachute and at least a portion of the payload, the payload unspinning device includes at least two yo-yo cords, each cord having a first end and a portion with a second end, the first end is coupled to the payload and the second end is attached to a cord weight, the portion with the second end of the at least two yo-yo cords is wound over at least a portion of the shroud, ejection of the cargo is preceded by an ejection command, ejection of the cargo is followed by unwinding of the at least two yo-yo cords, liberation of the shroud, deployment of the parachute, and stabilization of the payload, unspinning of the cargo unspins the payload for stabilizing parachuted payload descent, and contacting ground with at least one cord weight operates the payload.

5. The system of claim 4, wherein:

the parachute is coupled to the payload by one of a bearing mechanism and a fixed attachment.

6. The system of claim 4, wherein the shroud prevents tangling of the parachute as well as tangling of the parachute with the yo-yo cords, and ensures safe deployment of the parachute.

* * * * *